United States Patent Office.

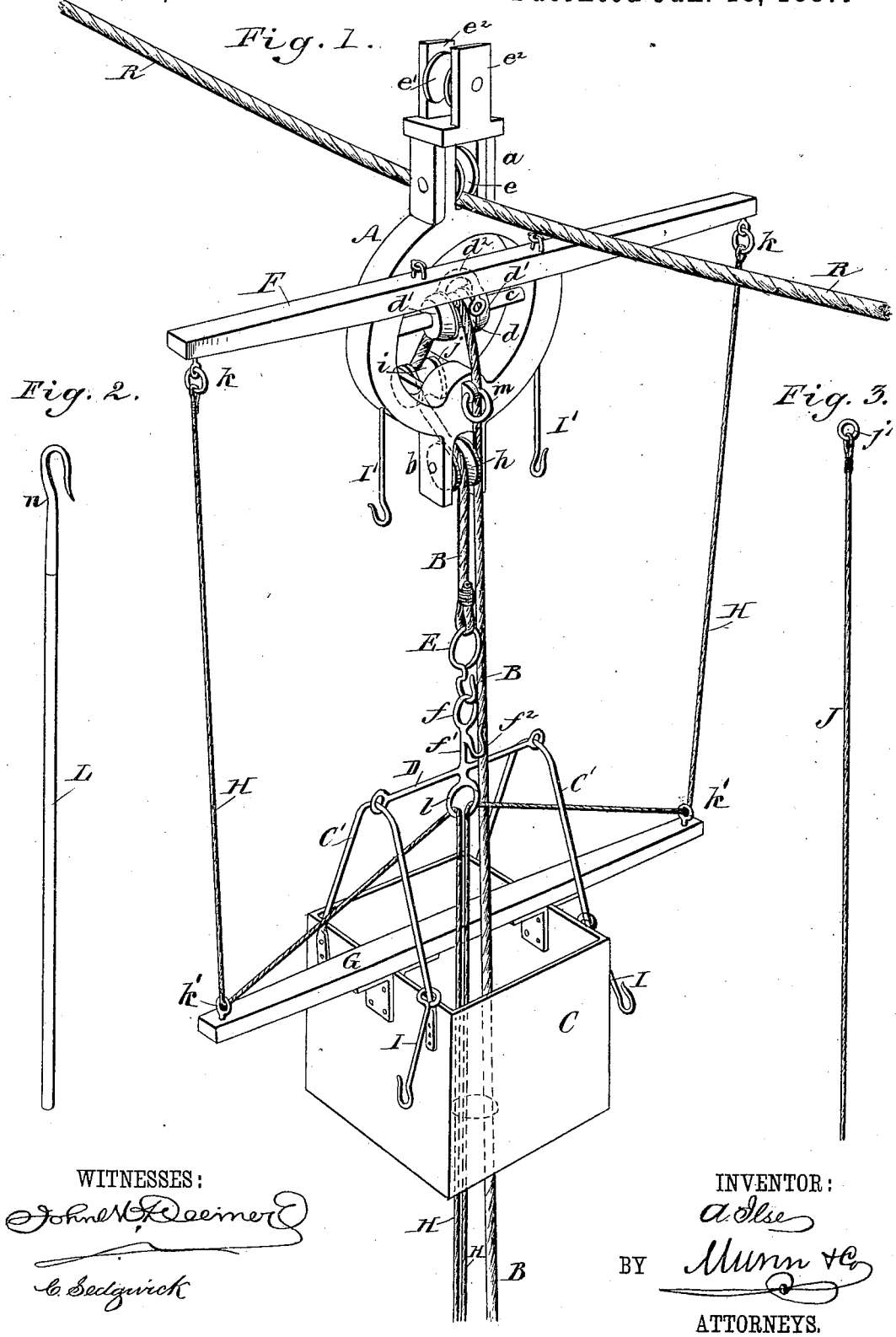

AUGUSTUS ILSE, OF EVANSTON, WYOMING TERRITORY.

HOISTING AND LOWERING APPARATUS.

SPECIFICATION forming part of Letters Patent No. 356,249, dated January 18, 1887.

Application filed February 24, 1886. Serial No. 193,011. (No model.)

*To all whom it may concern:*

Be it known that I, AUGUSTUS ILSE, of Evanston, Uinta county, Wyoming Territory, have invented a new and useful Improvement in Hoisting and Lowering Apparatus, of which the following is a full, clear, and exact description.

My invention relates to a hoisting and lowering apparatus, designed more especially for elevating and lowering goods, &c., in hatchways, or to and from the windows of a building, outside the wall. The apparatus may also be used as a fire-escape and for transferring goods and persons from one place to another in a building, or from one building or structure to another—as across a street. The apparatus may be operated from the ground or by a person or persons in the cage.

The invention consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is a perspective view of my new hoisting and lowering apparatus attached to an overhead rope, on which the whole apparatus is adapted to travel; and Figs. 2 and 3 are side views, respectively, of a hook and stay-rope used in connection with the apparatus.

A represents a block, made in this instance in the form of a ring, with upper extension, $a$, and lower extension, $b$. Across the center of the blocks A is placed the shaft $c$, on which is placed the pulley $d$, over which the main elevating-rope B passes. In the upper extension, $a$, is journaled the pulley $e$, that supports the apparatus upon the overhead rope R, on which the apparatus is adapted to travel.

To one end of the main hoisting-rope B is attached the cage C. The connection of the hoisting-rope to the cage may be effected by various means, but I prefer to use the two side bails, C' C', connected to the cage, the cross-bar D, placed upon the bails, the hook E, attached to the end of the hoisting-rope, and the ring $f$, attached to or made a part of the cross-bar D, with which ring the hook E engages. The ring $f$ is, by preference, made integral with the bar D and connected therewith by the short upright bar $f'$, and formed upon or attached to the upright bar $f'$ is the hook $f^2$, for the purposes hereinafter described. The main hoisting-rope B, from its point of connection with the cage C, passes over the pulley $h$, journaled in the lower extension, $f$, of the block A, thence over the pulley $i$, journaled in the side extension, $j$, of the block, thence over the above-mentioned central pulley, $d$, and thence down the side of or down through the cage C to the ground, so that a person on the ground or a person in the cage may draw upon the main hoisting-rope and raise or lower the cage and its contents.

A heavy horizontal cross-bar, F, is attached to the block A by staples or other suitable means, and another similar bar, G, is attached to the cage C, and the ends of these bars F G are each provided with rings or staples $k\ k'$, so that the ends of the bars may be connected by the ropes H H. From the rings or staples $k'$ the ropes H pass to and through the central ring, $l$, formed on or attached to the cross-bar D. From the ring $l$ the ropes H pass down through the cage C to the ground, so that a person upon the ground or in the cage may keep the apparatus square and prevent it from turning.

The rope R will be stretched along a building or across a street, or placed in any situation desired, and in case it is desired to attach the apparatus to the rope in the same plane therewith the rope will be passed under the upper pulley, $e'$, which is journaled between the plates $e^2\ e^2$ at right angles to the pulley $e$, as shown clearly in Fig. 1. Upon the bails C' are placed the hooks I I, and attached to the block A are the hooks I' I', with which the hooks I are adapted to engage when the cage is raised up to the block, so that the weight of the cage and its contents will be held directly by the block and not by the hoisting-rope. The cage will be so attached to the block when the apparatus is to be moved along the rope R. In case the apparatus is to remain stationary on the rope R after the cage and its contents have been elevated to the block A, and the cage attached thereto by the hooks I, the rope J (shown in Fig. 3) will be thrown around the rope R and the end of rope J will be passed through the ring $j'$, at one end of said rope, and then drawn up to form a tight connection of rope J with rope R. The free end of rope J will then be made fast to the ring m in the block A, so the apparatus cannot move either way upon the rope R. In case a person occupies the cage and has no assistance on the ground, but elevates himself by drawing upon the hoisting-rope B, and wishes to move along the rope R, after connecting hooks I I with hooks I' I', he will grasp the rope R by the hook n or the end of the pole L, and turn the pole so the hook will grip the rope R. Then the occupant of the cage will draw upon the pole and cause the whole apparatus to move along the rope R. In this manner, by shifting the hook as he proceeds, the occupant of the cage can traverse back and forth the whole length of the rope R.

In lowering the cage, (which may be done by letting away on the hoisting-rope B,) if it is desired to stop the cage short of the ground, the hoisting-rope may be doubled and passed double through the ring $l$ and the loop placed upon the hook $f^2$, which will act to hold the cage, and the hook $f^2$ being central to the cage it will prevent the cage from tipping.

In place of the rope R a rod of iron on an overhead railway might be used with the same result.

The pulley $d$ on the central shaft, $c$, is held in place by the two ferrules $d'$ $d'$, connected together by the bow $d^2$, which prevents the main hoisting-rope from leaving the pulley $d$.

Having thus fully described my invention, I claim as new and desire to secure by Letters Patent—

1. The pulley-block A, having a top pulley to run upon a horizontal line or rail, a central pulley, and two guide-pulleys, one at the bottom of the block, the other at the side and above the lower guide-pulley, substantially as shown and described.

2. The pulley-block A, provided with pulleys to run upon the rope R and to guide the main hoisting-rope and provided with the cross-bar F, in combination with the main hoisting-rope, the cage C, and the ropes H, the cage being provided with the cross-bar G, substantially as described.

3. The pulley-block A, provided with the hooks I' I', in combination with the cage C, provided with hooks I I, for attaching the cage to the pulley-block, substantially as described.

4. The cage C, provided with the bails C' C', in combination with the cross-bar D, placed upon the bails and formed or provided with the ring $l$ and hook $f^2$, substantially as and for the purpose set forth.

5. The combination, with the cage C, provided with the bails C', of the cross-bar D, fitted loosely upon the bails and formed with the ring $f$ and hook $f^2$, projecting from its upper side, and the ring $l$, projecting from its lower side, substantially as herein shown and described.

AUGUSTUS ILSE.

Witnesses:
JOHN STONE,
JESSE KNIGHT.